(12) United States Patent
Karl et al.

(10) Patent No.: US 10,156,838 B2
(45) Date of Patent: Dec. 18, 2018

(54) GEAR CUTTING MACHINE

(71) Applicant: Liebherr-Verzahntechnik GmbH, Kempten (DE)

(72) Inventors: Thomas Karl, Durach (DE); Marco Heider, Kempten (DE); Tobias Heilmannseder, Wiggensbach (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 320 days.

(21) Appl. No.: 14/482,725

(22) Filed: Sep. 10, 2014

(65) Prior Publication Data

US 2015/0073583 A1 Mar. 12, 2015

(30) Foreign Application Priority Data

Sep. 10, 2013 (DE) .......................... 10 2013 015 024

(51) Int. Cl.
*G05B 19/18* (2006.01)
*G05B 19/409* (2006.01)
(Continued)

(52) U.S. Cl.
CPC ............ *G05B 19/188* (2013.01); *B23F 23/00* (2013.01); *G05B 19/409* (2013.01); *G05B 2219/35488* (2013.01); *G05B 2219/36137* (2013.01); *G05B 2219/36146* (2013.01); *G05B 2219/36168* (2013.01); *G05B 2219/36198* (2013.01);
(Continued)

(58) Field of Classification Search
CPC ................ G05B 19/188; G05B 19/409; G05B 2219/36506; G05B 2219/36137; G05B 2219/36146; G05B 2219/36493; G05B 2219/36494; G05B 2219/36499; G05B 2219/36542; G05B 2219/36168; G05B 2219/36198; G05B 2219/35488; B23F 23/00
See application file for complete search history.

(56) References Cited

U.S. PATENT DOCUMENTS 6,243,619 B1 * 6/2001 Inamasu ............... G05B 19/409
   700/172
7,296,956 B2 * 11/2007 Dirnfeldner ........... B23Q 11/08
   345/7
(Continued)

FOREIGN PATENT DOCUMENTS

DE       4342648 A1   6/1995
DE    102010023728 A1  12/2011
(Continued)

OTHER PUBLICATIONS

"Prime Cube White Paper: Multi-Touch for Industrial Applications," MSC Microcomputers Systems Components Tuttlingen GmbH, Revision 1, Mar. 21, 2011, 13 pages.
(Continued)

*Primary Examiner* — Charles R Kasenge
(74) *Attorney, Agent, or Firm* — McCoy Russell LLP

(57) ABSTRACT

The present disclosure relates to a gear cutting machine having a machine control as well as having at least one display for displaying machine-relevant parameters, wherein the display is multitouch-operable and allows an operator input for controlling the gear cutting machine by multifinger gestures over the display.

21 Claims, 8 Drawing Sheets

(51) Int. Cl.
  *B23F 23/00* (2006.01)
  *G06F 3/0488* (2013.01)
(52) U.S. Cl.
  CPC .............. *G05B 2219/36493* (2013.01); *G05B 2219/36494* (2013.01); *G05B 2219/36499* (2013.01); *G05B 2219/36506* (2013.01); *G05B 2219/36542* (2013.01); *G06F 3/0488* (2013.01)

(56) References Cited

U.S. PATENT DOCUMENTS

| | | | | |
|---|---|---|---|---|
| 7,418,669 | B2* | 8/2008 | Melzer | G06F 9/4443 |
| | | | | 715/792 |
| 7,444,201 | B2* | 10/2008 | Dirnfeldner | B23Q 17/24 |
| | | | | 345/173 |
| 8,581,855 | B2* | 11/2013 | Spink | G01B 21/047 |
| | | | | 345/173 |
| 8,743,064 | B2* | 6/2014 | Conde | G06F 3/04847 |
| | | | | 345/173 |
| 9,317,193 | B2* | 4/2016 | Corvo | G05B 19/409 |
| 9,329,595 | B2* | 5/2016 | Lankalapalli | G05B 19/409 |
| 2005/0002151 | A1* | 1/2005 | Dirnfeldner | B23Q 11/08 |
| | | | | 361/616 |
| 2005/0055646 | A1* | 3/2005 | Melzer | G06F 9/4443 |
| | | | | 715/804 |
| 2005/0192684 | A1* | 9/2005 | Friedrich | G05B 19/4185 |
| | | | | 700/83 |
| 2007/0027561 | A1* | 2/2007 | Dirnfeldner | B23Q 17/24 |
| | | | | 700/83 |
| 2008/0180404 | A1* | 7/2008 | Han | G06F 3/04883 |
| | | | | 345/173 |
| 2009/0070704 | A1* | 3/2009 | Ording | G06F 3/0485 |
| | | | | 715/784 |
| 2009/0089225 | A1* | 4/2009 | Baier | G06Q 10/06 |
| | | | | 706/12 |
| 2009/0118852 | A1* | 5/2009 | Kumar | G05B 19/186 |
| | | | | 700/98 |
| 2009/0183111 | A1* | 7/2009 | Adams | G06F 9/451 |
| | | | | 715/804 |
| 2009/0222911 | A1* | 9/2009 | Chen | G05B 19/409 |
| | | | | 726/19 |
| 2009/0307627 | A1* | 12/2009 | Adams | G06F 9/451 |
| | | | | 715/781 |
| 2010/0023156 | A1* | 1/2010 | Trepina | G05B 19/406 |
| | | | | 700/175 |
| 2010/0039391 | A1* | 2/2010 | Spink | G01B 21/047 |
| | | | | 345/173 |
| 2010/0079386 | A1* | 4/2010 | Scott | G06F 3/0481 |
| | | | | 345/173 |
| 2010/0079499 | A1* | 4/2010 | Scott | G06F 3/04883 |
| | | | | 345/661 |
| 2010/0083110 | A1* | 4/2010 | Scott | G06F 3/04883 |
| | | | | 715/702 |
| 2011/0057594 | A1* | 3/2011 | Haas | G05B 19/406 |
| | | | | 318/473 |
| 2011/0304550 | A1* | 12/2011 | Romera Jolliff | G06F 3/016 |
| | | | | 345/168 |
| 2012/0011459 | A1* | 1/2012 | Ocampo | G06T 11/60 |
| | | | | 715/771 |
| 2012/0054671 | A1* | 3/2012 | Thompson | G06F 3/038 |
| | | | | 715/784 |
| 2012/0072008 | A1* | 3/2012 | Neumaier | G05B 19/182 |
| | | | | 700/164 |
| 2012/0229662 | A1* | 9/2012 | Lankalapalli | G05B 19/409 |
| | | | | 348/211.8 |
| 2012/0268240 | A1* | 10/2012 | Frerking | G05B 19/409 |
| | | | | 340/5.51 |
| 2013/0227427 | A1* | 8/2013 | Mockli | G06F 3/0485 |
| | | | | 715/747 |
| 2013/0227473 | A1* | 8/2013 | Corvo | G05B 19/409 |
| | | | | 715/799 |
| 2013/0232442 | A1* | 9/2013 | Groth | E03D 9/00 |
| | | | | 715/783 |
| 2014/0132720 | A1* | 5/2014 | Rogers | B21D 5/004 |
| | | | | 348/46 |
| 2014/0258916 | A1* | 9/2014 | Laycock | G05B 19/042 |
| | | | | 715/781 |
| 2014/0262392 | A1* | 9/2014 | Petrossians | G01M 1/22 |
| | | | | 173/20 |

FOREIGN PATENT DOCUMENTS

| | | |
|---|---|---|
| JP | H05216525 A | 8/1993 |
| KR | 20110137651 A | 12/2011 |

OTHER PUBLICATIONS

Korean Intellectual Property Office, Office Action Issued in Korean Patent Application No. 10-2014-0119072, dated Oct. 3, 2015, 12 pages.

German Patent and Trademark Office, Search Report of German Patent Application No. 102013015024.8, dated Nov. 28, 2013, 10 pages.

Haag, R., "Widescreen-Multitouch erfreut die Anwender", mav Kompetenz, Konradin Media Group, No. 5, May 2013, pp. 130-131. See NPL 1, Search Report of German Patent Application No. 102013015024.8 for explanation of relevance.

MSC Microcomputers Systems Components Tuttlingen GmbH, "Prime Cube Whitepaper—Multitouch in industriellen Anwendungen", http://www.primecube.de/fileadmin/user_upload/pdf_de/de_whitepaper_multitouch.pdf, Mar. 21, 2011, 14 pages. See NPL 1, Search Report of German Patent Application No. 102013015024.8 for explanation of relevance.

* cited by examiner

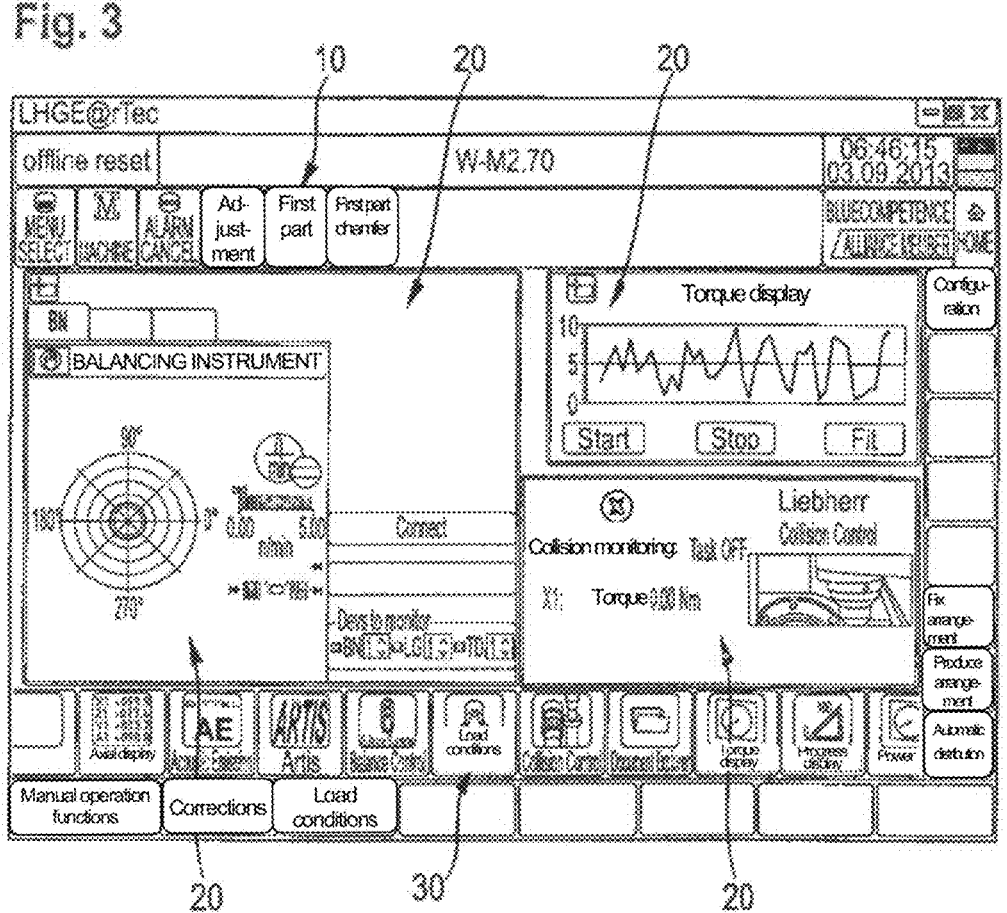

GEAR CUTTING MACHINE

CROSS REFERENCE TO RELATED APPLICATION

This application claims priority to German Patent Application No. 10 2013 015 024.8, entitled "Gear Cutting Machine," filed Sep. 10, 2013, which is hereby incorporated by reference in its entirety for all purposes.

TECHNICAL FIELD

The present disclosure relates to a gear cutting machine having a machine control as well as at least one display for displaying machine-relevant parameters.

BACKGROUND AND SUMMARY

Gear cutting machines currently comprise a display which is utilized for reproducing various operating parameters of the gear cutting machine. Required inputs for the control of the gear cutting machine are actuated by the operator via a separate, external operating element. The operating element as a rule comprises one or more mechanical keys or key panels via which specific control commands can be input by pressure actuation or configuration parameters can be programmed.

The operator can check the input control commands or read off the current operating parameters using the display element. The representation is in this respect fixedly predefined and not individually adaptable to the individual user. Such a machine control or operation admittedly serves its purpose, but is not particularly comfortable.

It is the object of the present disclosure to provide a gear cutting machine which allows a better and more comfortable handling.

This object is achieved by a gear cutting machine having a machine control as well as at least one display for displaying machine-relevant parameters. In accordance with the present disclosure, the at least one display is multitouch-operable and an operator input for controlling the gear cutting machine takes place at least in part by touching the display. The screen and the multitouch screen are optionally combined and lie on top of one another.

The operator can in particular input corresponding control commands into the gear cutting machine on the basis of various multifinger gestures, which allows a particularly comfortable operation of the gear cutting machine. The operator can touch the objects displayed on the screen, can drag them, change their size, rotate them or mark a plurality of objects simultaneously. Popular multifinger applications are zooming and rotating objects in that two fingers are moved apart from one another or rotated with respect to one another.

The at least one multitouch operable display can, for example, have a resistive, capacitive, optical or inductive touch-sensitive surface. It is conceivable that the gear cutting machine has both non-touch operable and touch operable displays.

The use of a multitouch operable display not only allows an optimized and more comprehensive human/machine interaction, but extensive possibilities are also opened up for implementing an innovative operating concept. It is conceivable that the visual display representation of the one or more machine parameters can be individually configured. Ideally, the visual representation of one or more machine-relevant parameters by an input via the touch-sensitive display can be configured with respect to the representation properties and with respect to the extent of the information shown.

The number of parameters can be varied with regard to the extent of the machine-relevant parameters shown to ensure a more comprehensive representation of information for the operator as desired or to ensure the clarity of the displayed information by reducing the information content. Ideally, the operator is given the possibility of selecting or temporarily displaying all available machine-relevant parameters for the representation. Unnecessary or less relevant parameters can be faded out or shown in the background.

An individual adaptation of the color, pattern, brightness, contrast effect with respect to the background, gloss effects, mirroring and reflection, shadows, etc. is conceivable. The adaptation can take place via the multitouch operable display.

Instructions can furthermore be provided which allow a user-dependent display representation of one or more machine-relevant parameters. Different representation skins or themes can be stored in a representation profile in memory.

The preparation of operator-dependent profiles is also possible. The gear cutting machine ideally has instructions for operator recognition and/or operator verification/authentication. A user-dependent display representation is ideally automatically generated or shown after inputting the user code.

One or more operator profiles can be stored which can be accessed by the operator manually or automatically and corresponding display representations can be automatically displayed. The user can thus configure the preferred type of representation once and can store it in his/her personal profile. A user-dependent display representation is in particular advantageous when the gear cutting machine is to be operated by a plurality of users. Each operator can access his individual display representation by selecting the respective profile.

In a particular embodiment, the display representation in the multitouch operable display is divided into one or more windows. Each window in this respect serves the presentation of a specific number of machine-relevant parameters. Each window can be configured individually via the touch display, in particular with respect to the window size and with respect to the type and extent of the machine-relevant parameters shown. The windows can, for example, be positioned at any desired point of the display. The same applies to the window size which can be altered particularly simply with the aid of a multifinger gesture.

It is equally conceivable in this connection that the display representation is not only divided into one or more windows, but rather into one or more virtual screens between which it is possible to browse to and fro with the aid of a swiping movement.

Provision can be made for a simple expansion of the machine functionality that the machine control is configured such that one or more external applications can be installed and executed on the machine. The gear cutting machine can thus be expanded with respect to functionality with regard to the basic functions provided by the manufacturer by installing various third-party applications. The one or more installed and executable third-party applications can in particular make use of the input and output possibility of the touch-sensitive display. The customers thus have the possibility to adapt or expand the functionality of the gear cutting machine to their personal desires by their own applications.

Furthermore, the gear cutting machine can have one or more storage devices, such as computer memory, for storing one or more video files. The reproduction of the one or more stored video files by the machine control can take place over the multitouch-operable display. The video files can include training films which offer the customer a video introduction into the function and configuration of the gear cutting machine. Individual video files can be executed by the operator over the multitouch-operable display and can be displayed via the display element.

Different data formats, i.e. video formats, can be stored on the storage device. In principle, everything can be stored and reproduced which a current operating system, for example Windows 7, can process. This can include PDF documents, CAD data, images, videos, etc.

The gear cutting machine can furthermore have one or more video recording devices. It is conceivable that such internal video cameras are arranged in the region of the machine table or workpiece mount and/or tool mount and can detect individual gear cutting processes. The executed processes of the gear cutting machine are frequently not accessible or visible from the machine desk of the gear cutting machine. The processes on the display can be displayed comfortably with the aid of the internal video camera and provide the user with insight into the gear cutting process. Furthermore, the provided image files of the one or more internal video cameras can also be recorded on an internal or, alternatively, an external storage device and can be provided for the later reproduction over the multitouch-operable display or over another display.

Further advantages and details of the present disclosure will be explained in more detail in the following with reference to a number of drawings.

BRIEF DESCRIPTION OF THE FIGURES

FIG. 3 shows a screenshot of the operating interface of the gear cutting machine in accordance with the present disclosure displayed on the multitouch display.

DETAILED DESCRIPTION

FIGS. 1 to 5 show different representations of the user interface of the gear cutting machine in accordance with the present disclosure, with the displayed objects of the user interface being able to be selected, dragged, enlarged or reduced in size, rotated, etc. by touching the multitouch-operable display of the gear cutting machine. The operation may take place by a simple touching of the display and/or by multifinger gestures. The multitouch interface offers different operating options, for example a "touch and hold" function, only "touch" or also a "touch and wipe" function. The user interface displayed by the gear cutting machine display device enables information on the gear cutting machine to be displayed during machine operation, and to receive user inputs to adjust operation of the gear cutting machine. The user interface may represent non-transitory instructions or code stored in memory coupled with a processor for carrying out the instructions. The gear cutting machine may include a control system, referred to as a machine control, coupled to one or more sensor, the display/user interface, and to one or more actuators such as motors, of the gear cutting machine.

The basic menu structure will be explained in more detail in the following with reference to the diagrams of the Figures. Various icons 10 are fixedly arranged at the top, right and bottom screen edges in the Figures and allow a direct access to a submenu (adjustment, first part, configuration, etc.) by touch or the direct execution of a machine command (for example, "Alarm Cancel"). The display of these icons is fixedly predefined and identical for every individually designed operator interface. The icons are components of the so-called main window.

Figure 1:
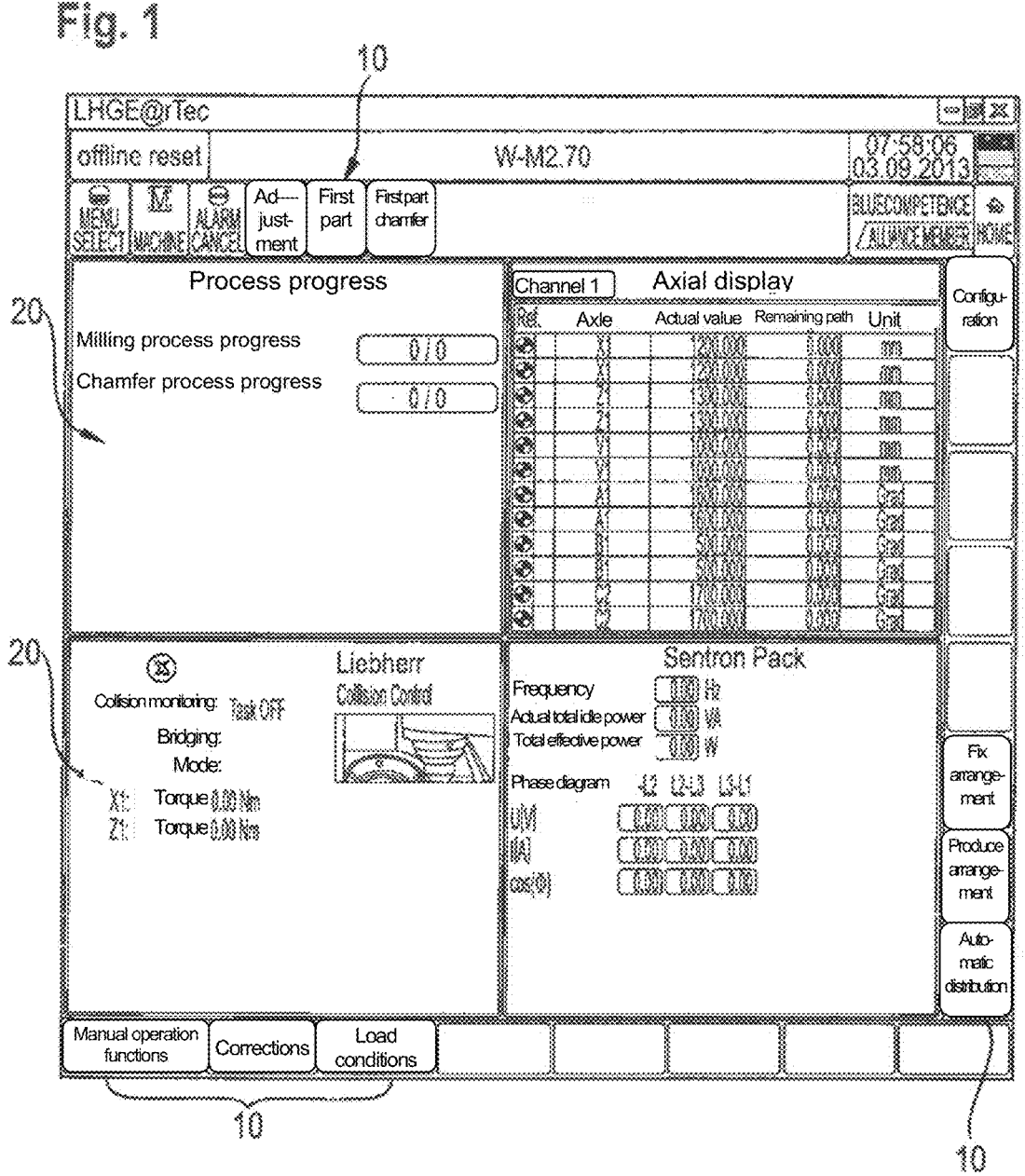
FIG. 1 shows a screenshot of the operating interface of the gear cutting machine in accordance with the present disclosure displayed on the multitouch display.

Four sub-windows 20 are displayed at the center of the main window in FIG. 1 which are arranged identically and symmetrically with one another with respect to their size. These sub-windows serve the representation of different machine parameters, with different sub-windows, i.e. different process views or sub-categories, showing. The user can individually configure the graphical design and the window content. A configuration of the information shown is only present for these sub-categories or sub-windows in which such a selection option appears expedient. The number of sub-windows displayed can likewise be freely determined.

FIG. 1 shows four sub-windows, with the first window relating to the current process progress of the workpiece machining. In the second sub-window arranged beside it to the right, the axial display is shown which outputs the current actual value for a configured number of the machine controlled CNC axles and displays the planned remaining path for the gear cutting machining.

In the two windows below, the collision monitoring is shown, on the one hand, at the left which is active during the gear cutting process and monitors individual machine components such as the machining head, an apparatus for clamping the workpiece and the workpiece itself for mutual collisions. For this purpose, different parameters and, where applicable, an impending risk of collision is displayed. Beside it to the right, a process view is displayed which shows individual power parameters of the axial drives used.

Figure 2:
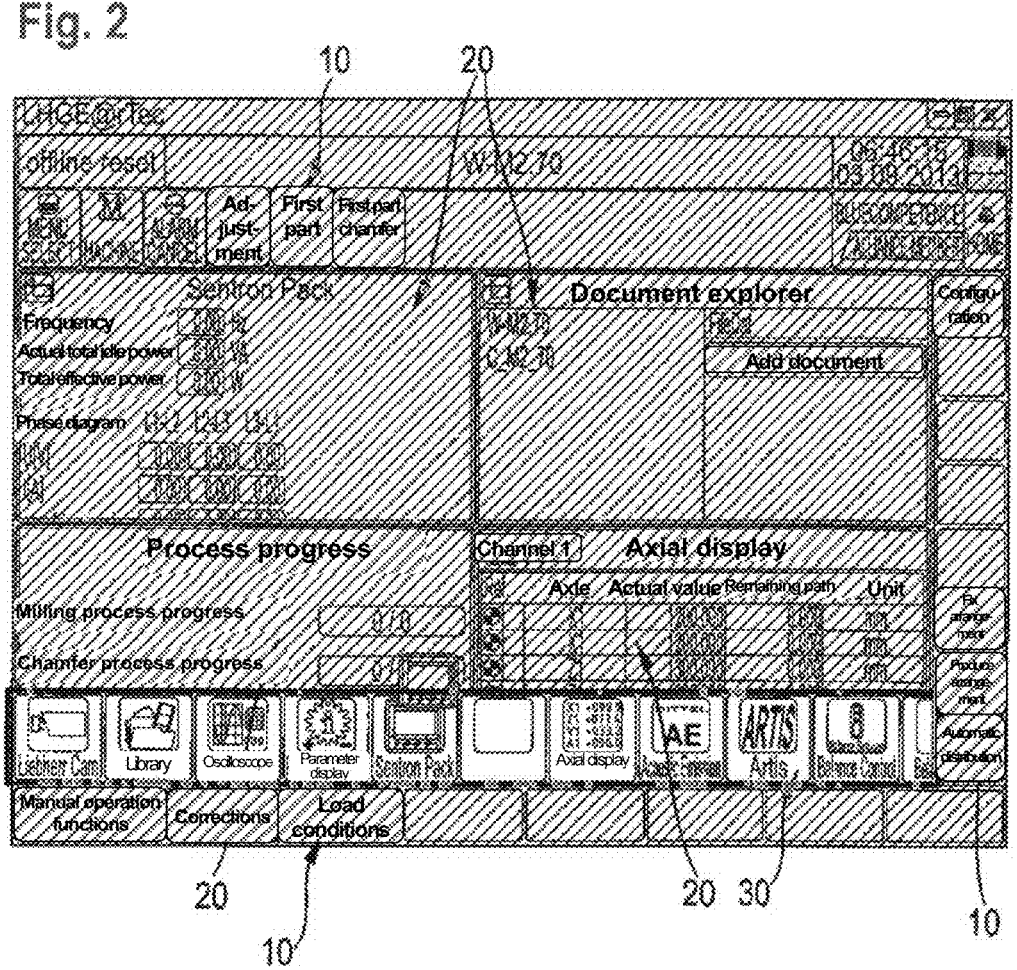
FIG. 2 shows a screenshot of the operating interface of the gear cutting machine in accordance with the present disclosure displayed on the multitouch display.

FIG. 2 now shows the process view selection bar 30 at the lower screen edge which is only emphasized here in this representation for the better clarity of the operating interface. The process view selection bar serves the selection of the individual process views, i.e. of the individual sub-windows, for the presentation on the main screen. This process view selection bar can be rotated through by a simple swipe movement until the desired sub-window is visible in the bar and can subsequently be dragged into the main screen by touching. The selected sub-window can be positioned at the desired point in the main window.

FIG. 3 shows an individual different arrangement of the individual process windows 20 which, unlike in FIG. 1, is not symmetrical. In addition, the window sizes of the process views were changed and configured according to the preferences of the user. FIG. 3 also shows that individual process views are not necessarily next to one another, but can also be positioned after one another, with the sub-window activated by touch moving into the foreground. There is equally the possibility of prioritizing a sub-window so that it always remains in the foreground. The individually designed operating interface can be stored as a profile, ideally as a user profile, on the gear cutting machine and is available for a later access. Every operator can consequently adapt it quickly to his/her needs on the putting into operation of the gear cutting machine by calling up a stored profile.

FIG. 3 shows by way of example three process views which represent the balancing unit, a torque display and likewise the collision monitoring.

Figure 4A:
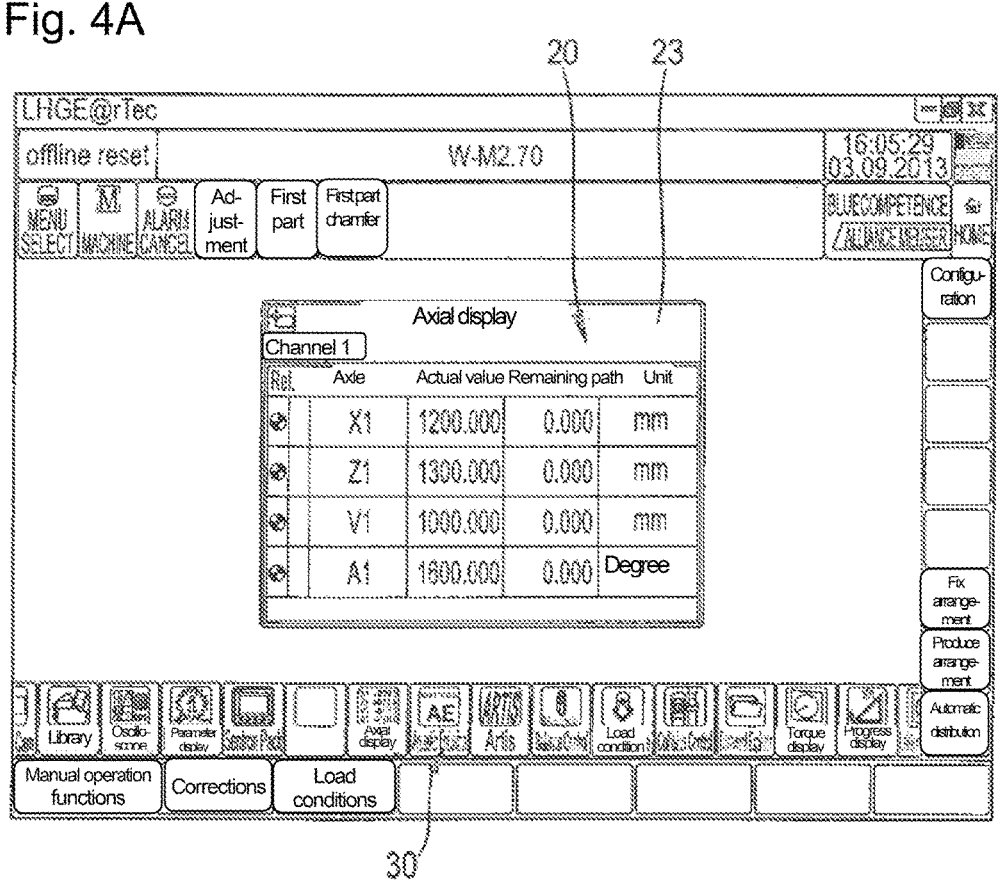
FIG. 4A shows a screenshot of the operating interface of the gear cutting machine in accordance with the present disclosure displayed on the multitouch display.
Figure 4B:
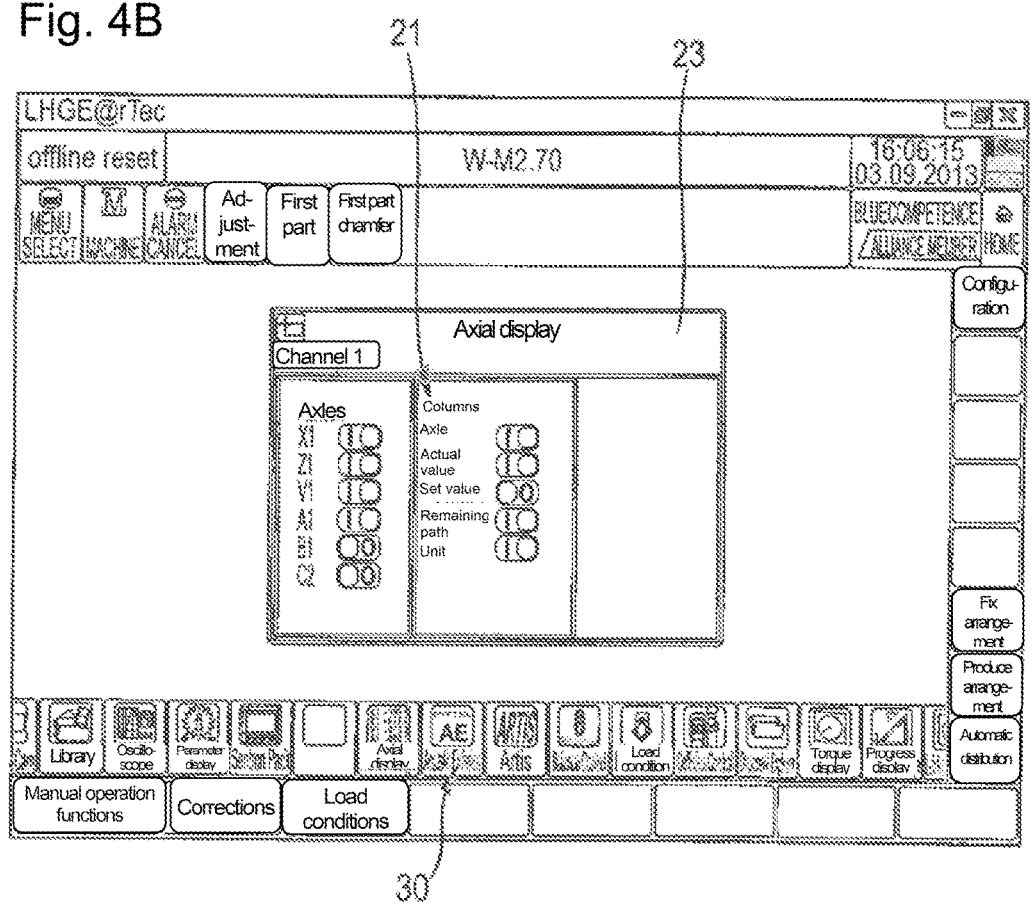
FIG. 4B shows a screenshot of the operating interface of the gear cutting machine in accordance with the present disclosure displayed on the multitouch display.

In FIG. 4A, in contrast, only one process view 20, namely the axial display, is shown in the main window. All further process views have been removed for reasons of better clarity. The shown information content of one individual process view 20, for example the axial display, is also freely configurable for specific process views 20. In the example of FIG. 4A, the axial display shows the X1 axle, the Z1 axle, the V1 axle and the A1 axle with their respective positions. If more or fewer axles should be displayed the head bar 23 of the process view 20 "axial display" is touched. The rear window side 21 in accordance with FIG. 4B is shown by an automatic flip movement. The corresponding selection switches allow the individual selection of individual axles for display in the front window side 20 in accordance with FIG. 4A.

In FIG. 4B, for example, the axles X1, Z1, V1, A1 are activated and the axles B1, C2 are deactivated. In addition to the selection of the axles to be displayed, the information shown with respect to the selected axles can also be varied. In this respect, for example, different information per axle is available in the sub-item "columns". By touching the head bar 23 of the rear window side 21 again, the window is again flipped into the starting situation, i.e. onto the front window side 20 in accordance with FIG. 4A, and the selected axles including the selected information are displayed. This flip function is available for all configurable windows of the individual process views.

Figure 5A:
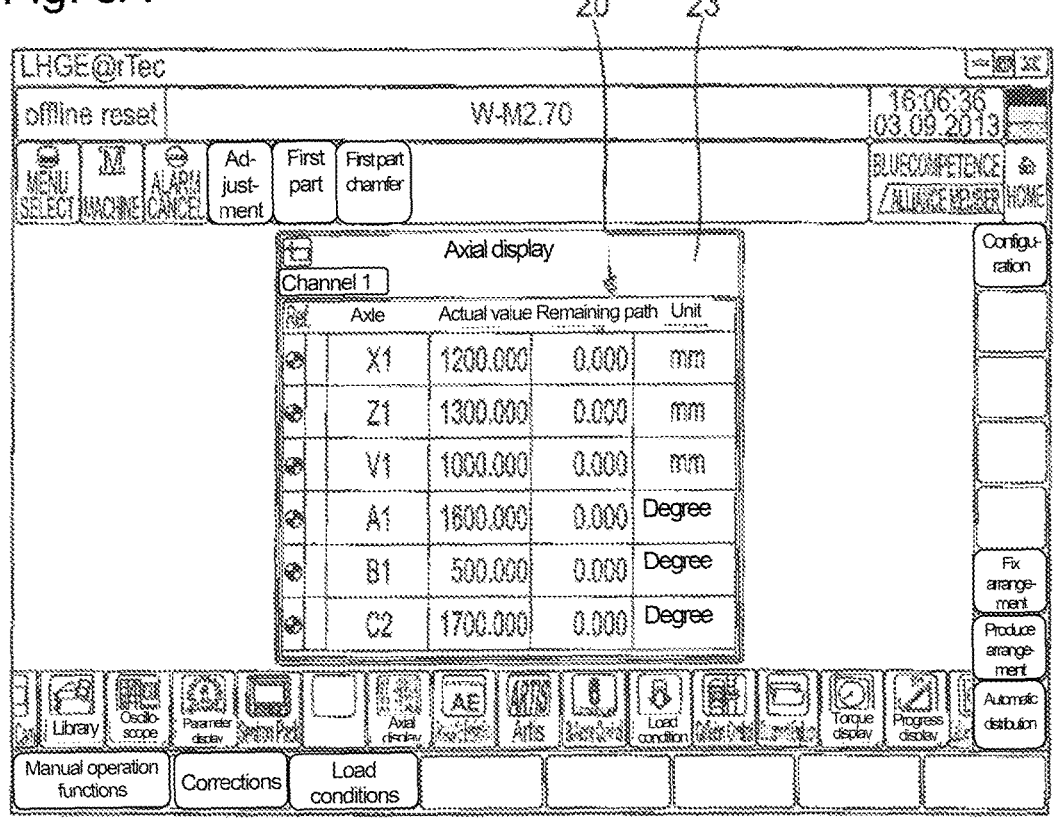
FIG. 5A shows a screenshot of the operating interface of the gear cutting machine in accordance with the present disclosure displayed on the multitouch display.
Figure 5B:
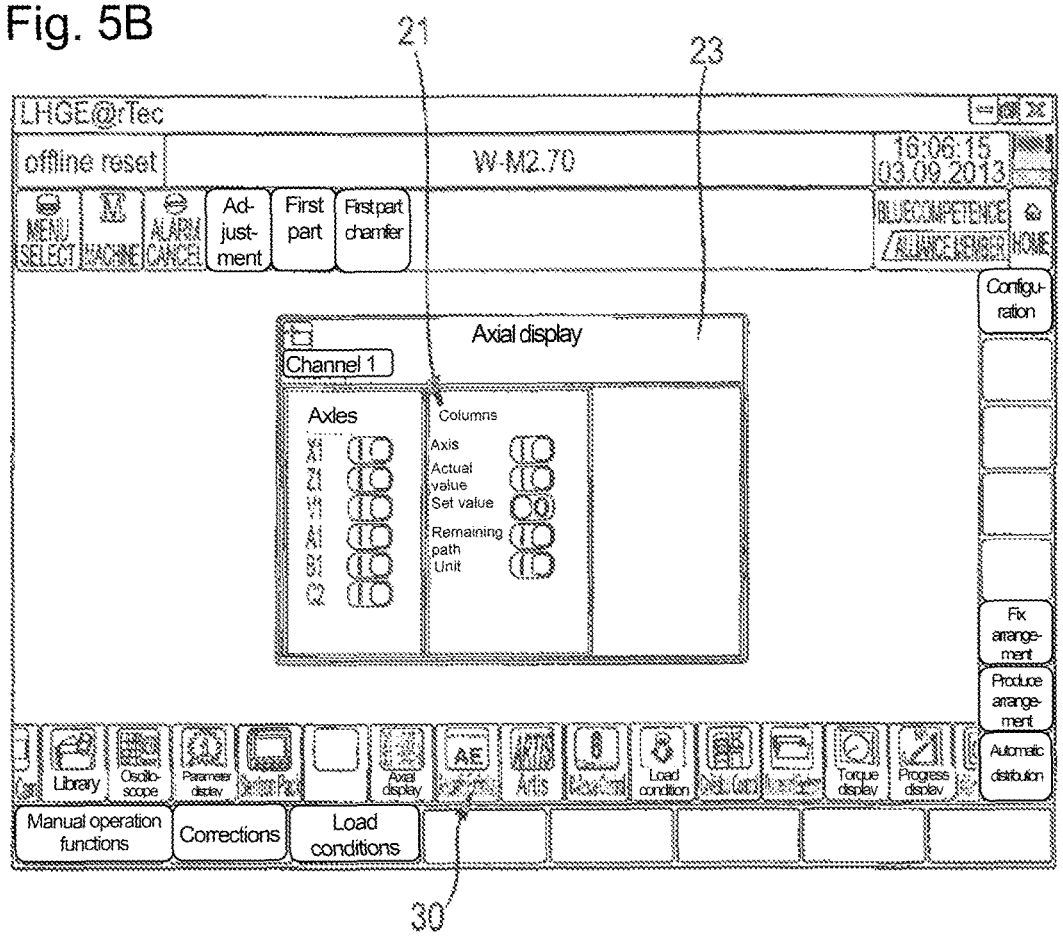
FIG. 5B shows a screenshot of the operating interface of the gear cutting machine in accordance with the present disclosure displayed on the multitouch display.

FIGS. 5A, 5B show a further example for an axial configuration with an associated selection window. In this respect, the display of all available machine axles of the gear cutting machine was activated on the rear window side 21, whereby they are completely displayed in the main window of the front window side 20 of the axial display.

The disclosed user interface it particularly suited to enable improved operation of the gear cutting machine and thus takes advantage of processor instructions, sensor information, and particular user inputs, to enable particular user inputs to be recognized and used to advantageously control operation of the gear cutting machine.

In one example, the gear cutting machine may be controlled to perform different gear cutting operations depending on whether the user input is via a touch input to the display device, versus a gesture input.

Figure 6:
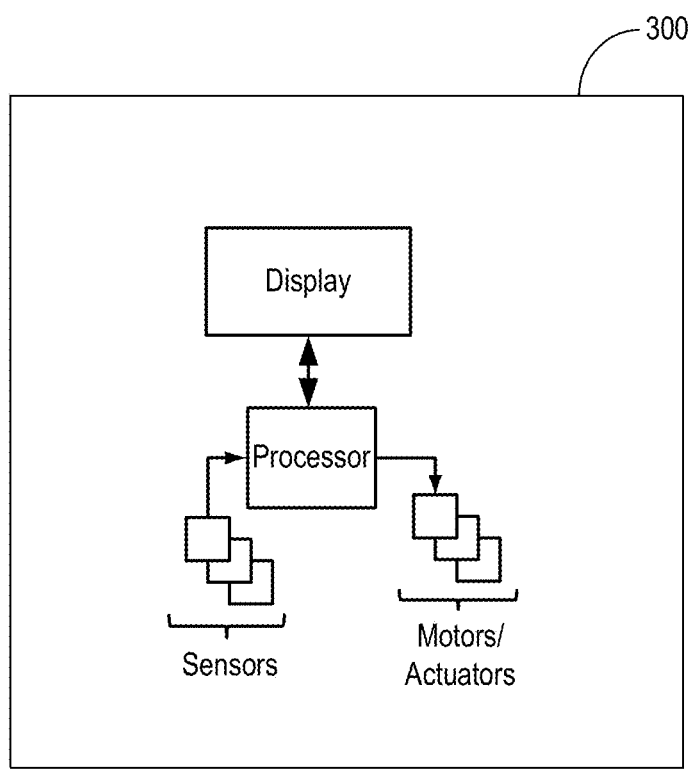
FIG. 6 illustrates the gear cutting machine schematically with a display element.

Referring to FIG. 6, it shows a gear cutting machine, such as the machine and corresponding systems described with regard to FIGS. 1-5. For example, gear cutting machine 300 is shown having a processor with memory having instructions stored therein for carrying out the various operations described herein, including communication with the display, which may be the display element described herein. The processor communicates with various sensors of the gear cutting machine as well as the display, and sends signals to the display and various actuators/motors of the gear cutting machine. In one example, the gear cutting machine comprises a machine control, such as the processor and associated sensor and actuators, as well as at least one display for displaying machine-relevant parameters, wherein the display is multitouch-operable and receives a user input for controlling the gear cutting machine by multifinger gestures over the display. In this way, the gear cutting machine may improve the overall efficiency of the gear cutting process by reducing cycle times with reduced error. For example, subsequent automatic gear cutting operation based on the user input carried out by the machine control can be commenced more quickly, requiring less downtime and more efficient gear production.

The invention claimed is:

1. A gear cutting machine comprising:
a machine control as well as at least one display for displaying machine-relevant parameters, wherein the at least one display for displaying machine-relevant parameters is multitouch-operable and receives a user input for controlling the gear cutting machine by multifinger gestures over the at least one display for displaying machine-relevant parameters,
wherein the gear cutting machine has a user-dependent display representation of one or more machine-relevant parameters, with use profiles being stored and accessed again that cause the user-dependent display representation to be displayed, and
wherein the user-dependent display representation on the at least one display for displaying machine-relevant parameters is divided into at least two windows, with each window representing a specific number of machine-relevant parameters and each window being continuously user configurable over the at least one display for displaying machine-relevant parameters with respect to an extent of the machine-relevant parameters shown, orientation of the machine-relevant parameters shown, and at least one of a window size and/or a type.

2. The gear cutting machine in accordance with claim 1, wherein the user-dependent display representation of the one or more machine-relevant parameters is configured with respect to their properties and extent by touch input over the at least one display for displaying machine-relevant parameters.

3. The gear cutting machine in accordance with claim 1, wherein the user-dependent display representation on the display may be configured to fade unnecessary machine-relevant parameters.

4. The gear cutting machine in accordance with claim 1, wherein the gear cutting machine has instructions stored in memory for operator recognition and/or operator verification and/or operator authentication.

5. The gear cutting machine in accordance with claim 1, wherein the gear cutting machine performs different gear cutting operations based on the received user input.

6. The gear cutting machine in accordance with claim 1, wherein the machine control of the gear cutting machine is configured such that one or more third-party applications are installable and executable on the gear cutting machine by a processor of the machine control, with an input/output of the multitouch display operable with the one or more third-party applications.

7. The gear cutting machine in accordance with claim 1, wherein the gear cutting machine has a storage device for storing one or more video files and the machine control enables reproduction of the one or more video files over the at least one display for displaying machine-relevant parameters.

8. The gear cutting machine in accordance with claim 1, wherein the gear cutting machine has at least one internal video camera, with recorded image files being displayable on the at least one display for displaying machine-relevant parameters and/or recordable on an internal or external storage device.

9. The gear cutting machine in accordance with claim 1, wherein the gear cutting machine has two or more multitouch-operable displays.

10. The gear cutting machine of claim 1, wherein the divided user-dependent display representation comprises a plurality of sub-windows comprising different machine-relevant parameters wherein a user can individually configure a graphical design and a window content to display a specified axis of the data comprising the machine-relevant parameter of interest and wherein the different machine-relevant parameters displayed are dynamically updated.

11. The gear cutting machine of claim 1, wherein the divided user-dependent display representation comprises a plurality of sub-windows comprising different sets of machine-relevant parameters, wherein each of the different sets of machine-relevant parameters is selected from current process progress of workpiece machining, a current actual value for a configured number of machine controlled CNC axels, a planned path for the gear cutting machining, collision monitoring, and individual machine components.

12. A method for controlling a gear cutting machine comprising:
accessing a stored use profile;
displaying, via a display device with a touch screen, machine-relevant parameters of the gear cutting machine in a user-dependent display representation that is based on the accessed use profile,
wherein the user-dependent display representation is a display that is divided into at least two windows, with each window representing a specific number of machine-relevant parameters and each window being continuously user configurable over the display with respect to an extent of the machine-relevant parameters shown, features of the axial display of the content of each window, and at least one of a window size and/or a type and/or an extent of the machine relevant parameters shown;
receiving a user input through multitouch inputs to the display device and by multifinger gestures over the display; and
controlling operation of the gear cutting machine based on the user input.

13. A gear cutting machine comprising:
a machine control system having a processor and memory with instructions stored therein;
at least one display for displaying machine-relevant parameters via the machine control system;
wherein the at least one display for displaying machine-relevant parameters via the machine control system is multitouch-operable and receives a user input for controlling the gear cutting machine by multifinger gestures over the at least one display for displaying machine-relevant parameters,
wherein the gear cutting machine has a user-dependent display representation of one or more machine-relevant parameters, with use profiles being stored and accessed again that cause the user-dependent display representation to be displayed, and
wherein the user-dependent display representation on the at least one display for displaying machine-relevant parameters via the machine control system is divided into at least two windows, with each window representing a specific number of machine-relevant parameters and each window being continuously user configurable over the display with respect to an extent of the machine-relevant parameters shown, a graphical design of the axial display of the content of each window, and at least one of a window size and/or a type.

14. The gear cutting machine in accordance with claim 13, wherein the user-dependent display representation of the one or more machine-relevant parameters is configured with respect to their properties and extent by touch input over the at least one display for displaying machine-relevant parameters via the machine control system.

15. The gear cutting machine in accordance with claim 13, wherein the gear cutting machine performs different gear cutting operations based on the received user input.

16. The gear cutting machine in accordance with claim 13, wherein the gear cutting machine has instructions stored in memory for operator recognition and/or operator verification and/or operator authentication.

17. The gear cutting machine in accordance with claim 13, wherein a planned remaining path for the gear cutting machine is displayed.

18. The gear cutting machine in accordance with claim 17, wherein the machine control system of the gear cutting machine is configured such that one or more third-party applications is installable and executable on the gear cutting machine by a processor of the machine control system, with an input/output of the multitouch display operable with the one or more third-party applications.

19. The gear cutting machine in accordance with claim 18, wherein the gear cutting machine has a storage device for storing one or more video files and the machine control system enables reproduction of the one or more video files over the at least one display for displaying machine-relevant parameters via the machine control system.

20. The gear cutting machine in accordance with claim 17, wherein the gear cutting machine has at least one internal video camera, with recorded image files being displayable on the at least one display for displaying machine-relevant parameters via the machine control system and/or recordable on an internal or external storage device.

21. The gear cutting machine in accordance with claim 19, wherein the gear cutting machine has two or more multitouch-operable displays.

* * * * *